United States Patent
Kunz (10) Patent No.: US 7,204,536 B2
(45) Date of Patent: Apr. 17, 2007

(54) PIVOT OUT ROOM FOR VEHICLE

(75) Inventor: James R. Kunz, Eugene, OR (US)

(73) Assignee: Actuant Corporation, Glendale, WI (US)

( * ) Notice: Subject to any disclaimer, the term of this patent is extended or adjusted under 35 U.S.C. 154(b) by 0 days.

(21) Appl. No.: 11/289,162

(22) Filed: Nov. 29, 2005

(65) Prior Publication Data
US 2006/0113814 A1   Jun. 1, 2006

Related U.S. Application Data

(60) Provisional application No. 60/631,404, filed on Nov. 29, 2004.

(51) Int. Cl.
*B60P 3/34* (2006.01)
(52) U.S. Cl. .................. 296/26.01; 296/26.15
(58) Field of Classification Search ............ 296/26.01, 296/26.15, 171, 175, 165
See application file for complete search history.

(56) References Cited

U.S. PATENT DOCUMENTS

| | | | | |
|---|---|---|---|---|
| 1,965,451 A | * | 7/1934 | Brown | 296/26.15 |
| 2,384,659 A | * | 9/1945 | Wait | 296/26.15 |
| 3,300,914 A | * | 1/1967 | Stewart et al. | 296/26.15 |
| 3,737,191 A | * | 6/1973 | Fackre | 296/26.15 |
| 4,312,159 A | | 1/1982 | Paul | |
| 4,653,800 A | * | 3/1987 | Myers | 296/26.02 |
| 4,981,318 A | * | 1/1991 | Doane et al. | 296/26.15 |
| 5,758,918 A | | 6/1998 | Schneider et al. | |
| 5,934,728 A | * | 8/1999 | Nishi et al. | 296/26.15 |
| 6,053,551 A | * | 4/2000 | Blondeau | 296/26.01 |
| 6,082,799 A | * | 7/2000 | Marek | 296/26.12 |
| 6,299,229 B1 | * | 10/2001 | Becenas Nieto | 296/26.13 |
| D488,744 S | * | 4/2004 | Ciarfello | D12/104 |
| 6,866,317 B2 | * | 3/2005 | Ferren | 296/26.15 |
| 7,052,065 B2 | * | 5/2006 | Rasmussen | 296/26.01 |

\* cited by examiner

*Primary Examiner*—Kiran B. Patel
(74) *Attorney, Agent, or Firm*—Quarles & Brady LLP (57) ABSTRACT

A recreational vehicle has pivot out rooms across the hallway from one another, at least partially overlapping from side to side along the length of the vehicle and arranged so that when they are retracted they create a hallway that has generally parallel sides. A thrust bearing supports the weight of each pivot out room and the hinge axis is inside of the vehicle so as to move the seal flange of the pivot out room out away from the recreational vehicle wall so as not to destroy the seals upon opening and to create a seal upon opening. A cog drive can be used to drive the room in and out and bear some of the room weight.

17 Claims, 9 Drawing Sheets

PIVOT OUT ROOM FOR VEHICLE

CROSS-REFERENCE TO RELATED APPLICATIONS

This application claims priority to U.S. Provisional Patent Application 60/631,404 filed Nov. 29, 2004.

STATEMENT REGARDING FEDERALLY SPONSORED RESEARCH OR DEVELOPMENT

Not applicable.

FIELD OF THE INVENTION

This invention relates to expandable vehicles, and more particularly to a pivot out room for expanding living space in a recreational vehicle.

BACKGROUND OF THE INVENTION

Because recreational vehicles are mobile vehicles, the width of the vehicle, and therefore of the interior space, is limited by size restrictions associated with public roads. It is, however, highly desirable to provide additional living space when the vehicle is parked. Accordingly, it is common to include slide-out rooms that can be retracted into the interior of the vehicle when the vehicle is traveling, and extended from the interior of the vehicle to provide additional space when the unit is parked for use.

Slide-out rooms to expand the living space for recreational vehicles are well known and typically consist of a five-sided box with the inside wall open that slides in and out of the opening in a sidewall of the recreational vehicle. Gaskets are provided around the perimeter of the slide-out to seal the perimeter both when the slide-out is retracted and when it is extended. Typically, slide-out rooms are extended from and retracted using a pair of support rails that telescopically extend and retract through a corresponding pair of channels, and may be extended and retracted either by power or manually, and typically also include some means for locking the slide-out in both the retracted position and the extended position.

Also known in the art, although less common than slide-out rooms, are pivot out rooms. Pivot out rooms pivot about either a horizontal or a vertical axis. To date, these types of rooms have not found widespread acceptance. One reason is that the mechanisms employed in prior art pivot out rooms were of insufficient quality and dependability to compete with the slide-out units. Furthermore, sealing of the pivot-out rooms has problematic in prior art devices. The present invention addresses these problems.

BRIEF SUMMARY OF THE INVENTION

The present invention provides a pivot-out unit for an expandable vehicle that pivots about a vertical axis at one end of the unit. In top view, the unit is generally wedge shaped. A vertically-oriented hinge on the inside of the vehicle provides an axis that creates an arc that causes a seal flange at the hinged corner of the pivot out room to move out away from the stationary recreational vehicle wall to preserve the seal when the room is pivoted out. This motion also permits creating a seal between an end surface of the pivot out room wall and the stationary vehicle wall as the room is pivoted out. A seal may also be provided on the inside that seals when the room is pivoted out.

In another aspect, the hinge is provided with a thrust washer that supports at least part of the weight of the room at the hinged end of the room. The room is largely cantilevered from the hinge and therefore if the room is rigid, no additional support is required. However, to prevent sagging at the opposite end of the room, additional support may be provided such as rollers or sliders between the pivot out room and the recreational vehicle, or the drive system may be used to provide support at that end.

In another aspect of the invention, two pivot out rooms can be arranged in a vehicle on opposite walls across from one another. One of the rooms has its hinge toward the rear of the vehicle and the other room has its hinge toward the front. This way, there is sufficient room or clearance created when the pivot out rooms are pivoted in to allow users to walk through the vehicle, and yet a very large dimension is created between the corners of the two pivot out rooms, on a diagonal, when the rooms are pivoted out.

In one aspect, the present invention provides a vehicle of the type having a stationary section and a pivot out section that can be pivoted out away from a stationary section to expand the interior space of the vehicle. A hinge is provided to connect a pivoted end of the pivot-out section to the stationary portion of the vehicle. The pivot axis of the hinge is spaced inwardly from the outer surface of the stationary portion of the vehicle, and is adapted to compress a seal between an end surface of the pivot out section and a stationary portion of the vehicle when the pivot out section is extended from the vehicle. The hinge axis can be aligned with the seal.

The axis can be spaced a distance from the end of the coach wall on the side of the coach wall opposite from the pivot out section. An exterior wall of the pivot out section can include a seal flange for compressing the seal between the pivot-out section and the stationary portion of the vehicle when the pivot out section is in a retracted position. The axis can be positioned to move the seal flange away from the outer seal when the pivot out section is extended from the vehicle. A second seal can be coupled to the end surface of the pivot out section, the second seal compressing against the seal when the pivot out section is in the extended position.

In another aspect, the invention provides a recreational vehicle in which two pivot out room sections are provided on opposing sides of the vehicle. The sections can at least partially overlap from side to side along the length of the vehicle, and one section can have its pivot axis toward the front of the vehicle and the other can have its pivot axis toward the rear of the vehicle. The two sections can have parallel sides and create a hallway in the interior of the vehicle when retracted. The pivot-out room sections can be wedge-shaped and include a pointed end, and can further be pivoted about the pointed end.

In another aspect of the invention, a vehicle having a pivot out room pivotable about a vertical axis is provided including a hinge assembly that connects the pivot out section to a stationary portion of the vehicle. The hinge assembly includes a thrust bearing that supports at least a portion of the weight of the pivot out section.

In another aspect of the invention, a recreational vehicle is provided including a pivot out room section that is pivoted out about a vertical axis, and a cog drive system for driving the pivot out room section about the vertical axis. The cog drive system can include a cog rack coupled to a bottom surface of the pivot out section and a cog wheel coupled to a floor of the recreational vehicle, and the cog rack can include teeth sized and dimensioned to mesh with teeth in the cog wheel. The rack can be arced to follow a radial line about the vertical axis, or can be configured along a straight line.

These and other advantages of the invention will be apparent from the detailed description and drawings.

BRIEF DESCRIPTION OF THE DRAWINGS

FIG. 1 is a top schematic view in section showing typical slide-out rooms toward the rear of a motor home recreational vehicle and pivot out rooms pivoted in toward the front, the lower pivot out room having its hinge toward the rear and the upper pivot out room having its hinge toward the front, with the rooms across from one another so as to create a hallway between them having parallel sides and enough room to pass even when the rooms are pivoted in;

DETAILED DESCRIPTION OF THE PREFERRED EMBODIMENT

Figure 1:
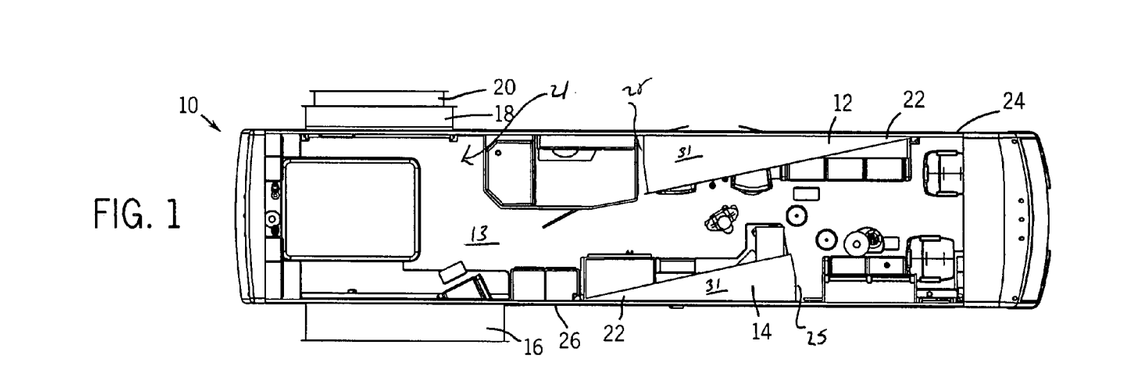
Figure 2:
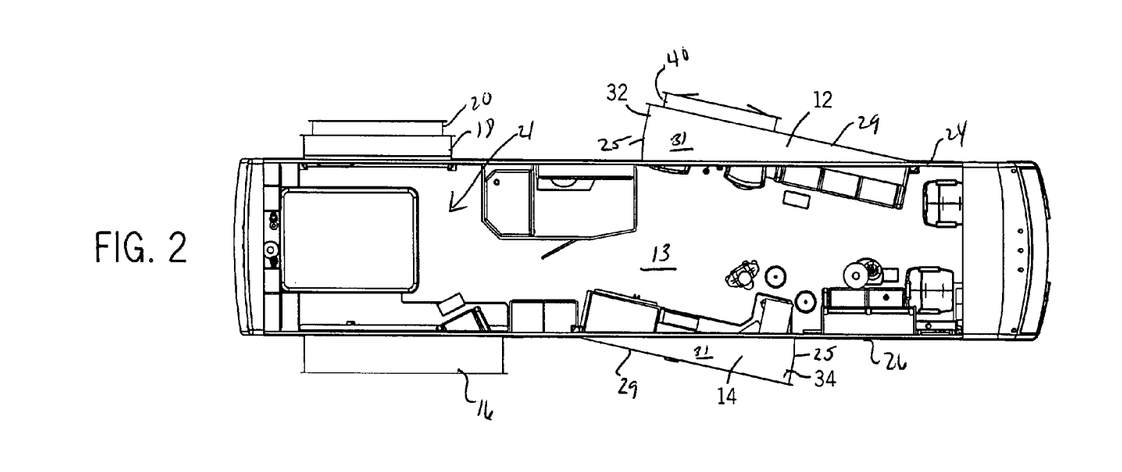
FIG. 2 is a view like FIG. 1, with the pivot out rooms pivoted out.
Figure 3:
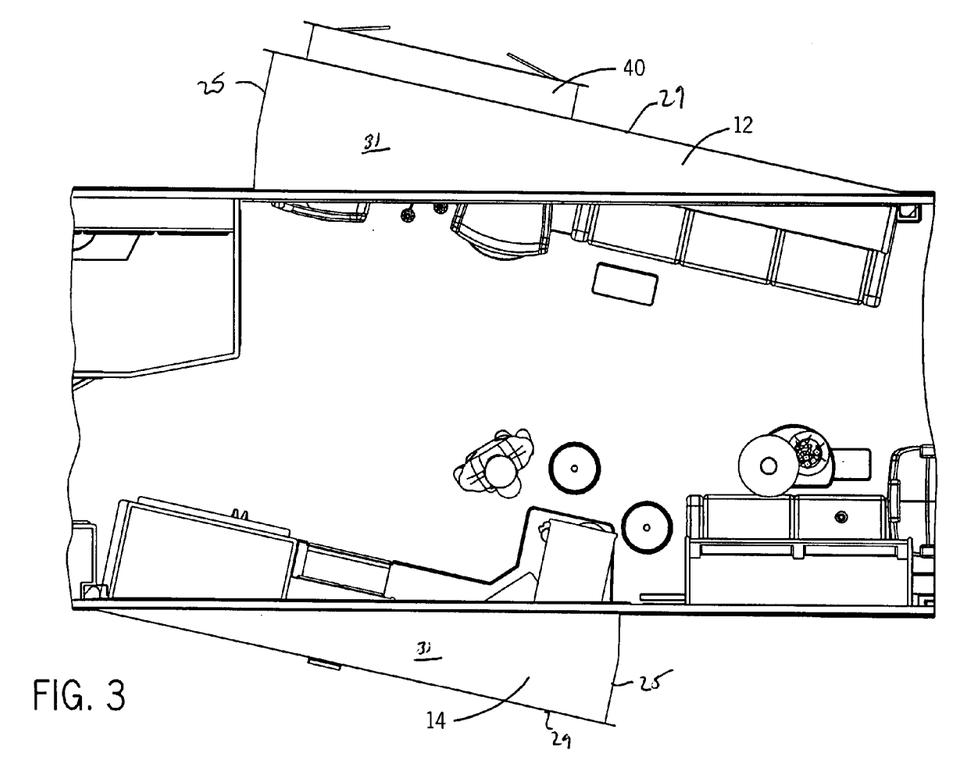
FIG. 3 is a view like FIG. 2, showing more detail.
Figure 4:
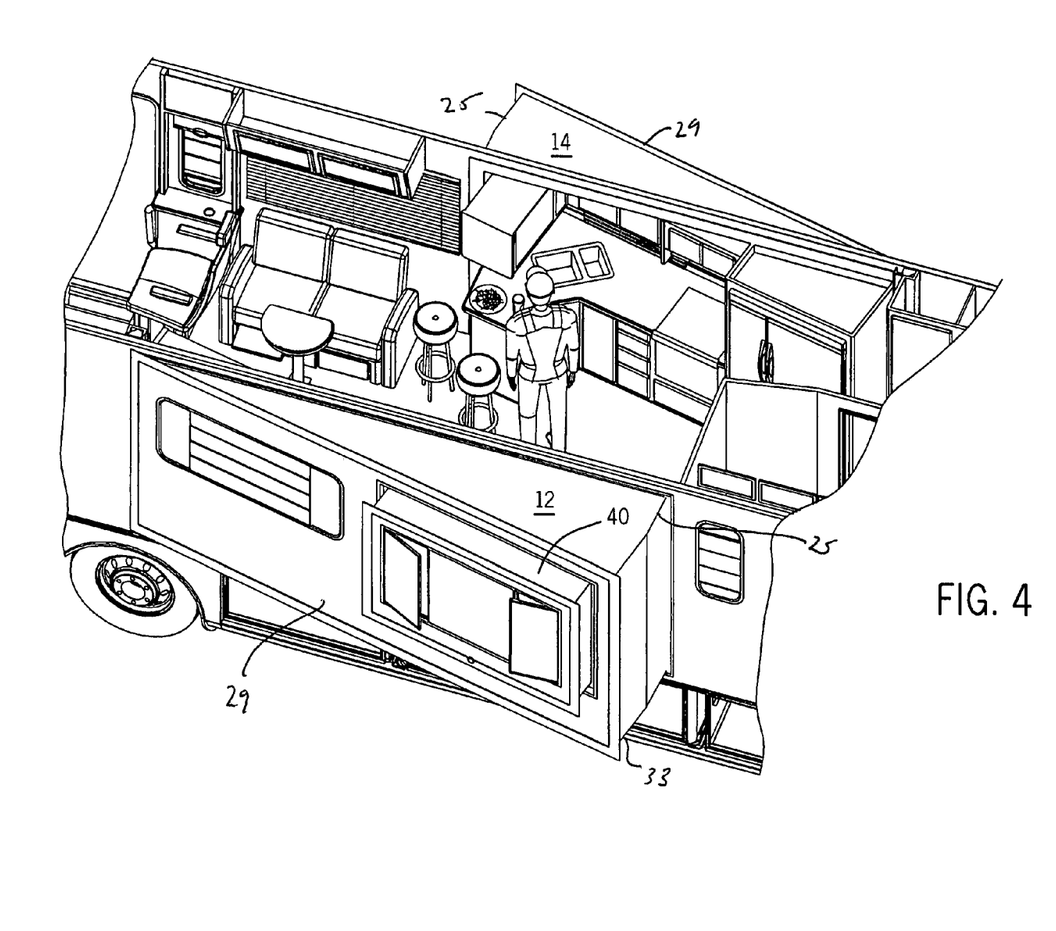
FIG. 4 is a view like FIG. 3, in perspective.
Figure 5:
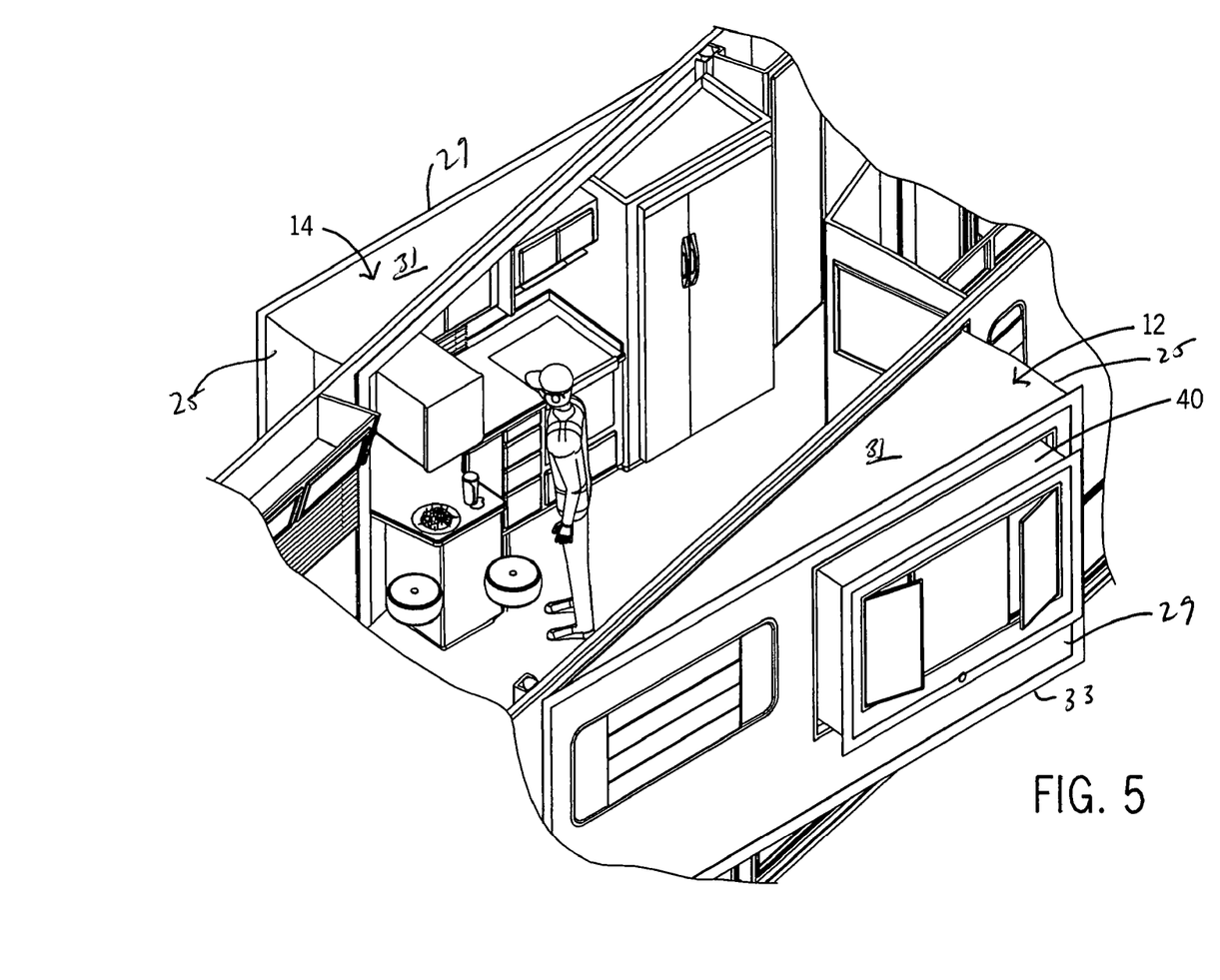
FIG. 5 is another perspective view like FIG. 4 from a different angle.
Figure 6:
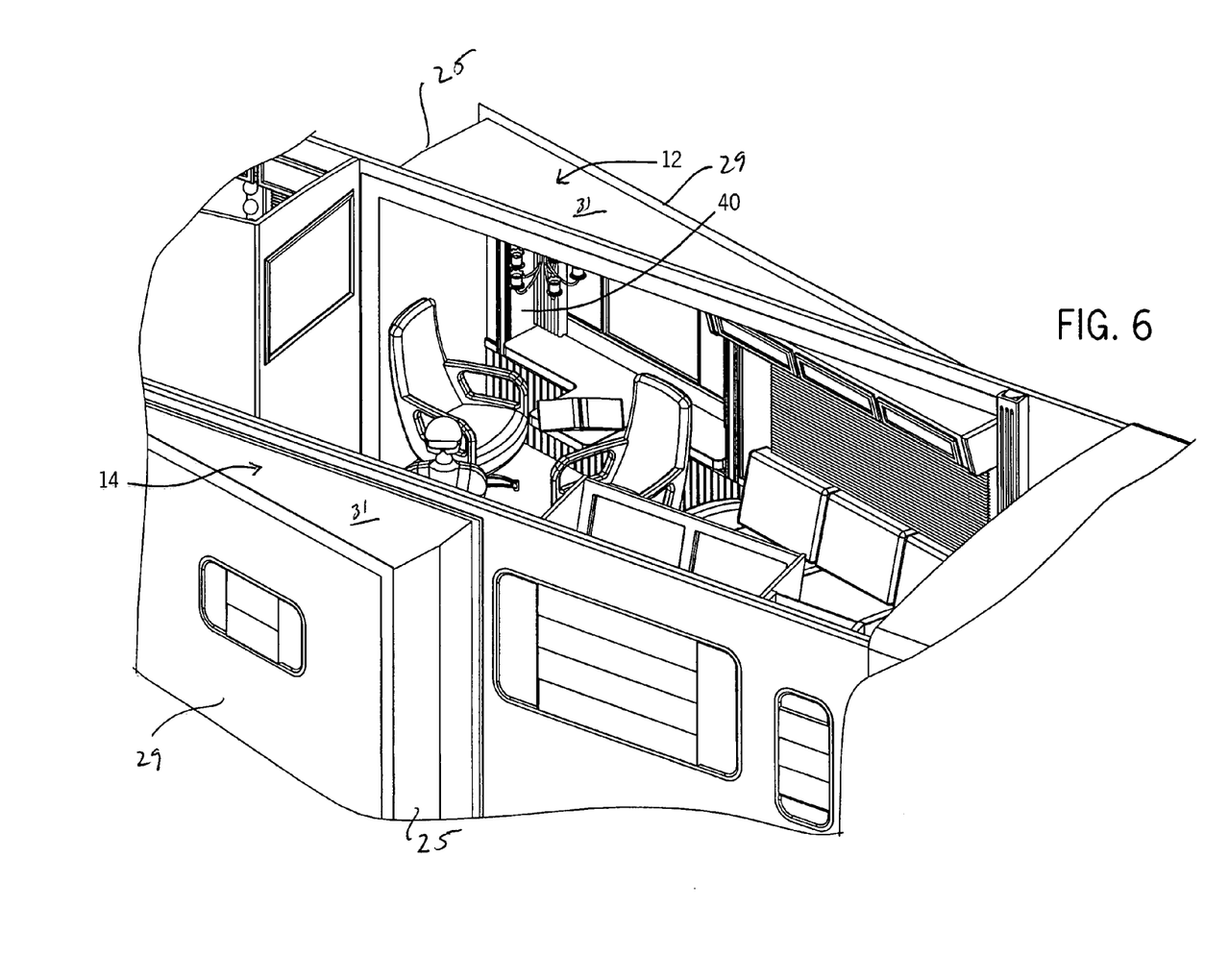
FIG. 6 is another perspective view from a different angle.

Referring now to the Figures, and more particularly to FIGS. 1 and 2, a recreational vehicle 10 constructed in accordance with the present invention is shown. The recreational vehicle 10 includes exterior walls 24 and 26 surrounding a floor 13 to define a vehicle interior 21. To provide additional space for the vehicle interior 21, swing-out or pivot-out sections 12 and 14 are hinged to the vehicle 10 and can be pivoted through apertures in the walls 24 of the vehicle 10 between a retracted (FIG. 1) and an extended or expanded (FIG. 2) position. In the extended position, the rooms 12 and 14 provide additional living space for the vehicle 10. To provide even more living space, the vehicle 10 can also have slide-out sections, such as the illustrated sections 16, 18 and 20 (section 20 being nested in section 18). These slide-out sections can be of any suitable construction.

Figure 7:
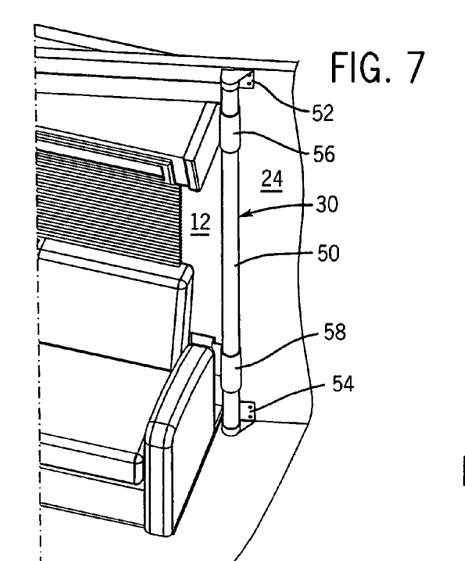
FIG. 7 is a detail perspective view illustrating a hinge of one of the pivot out rooms.
Figure 8:
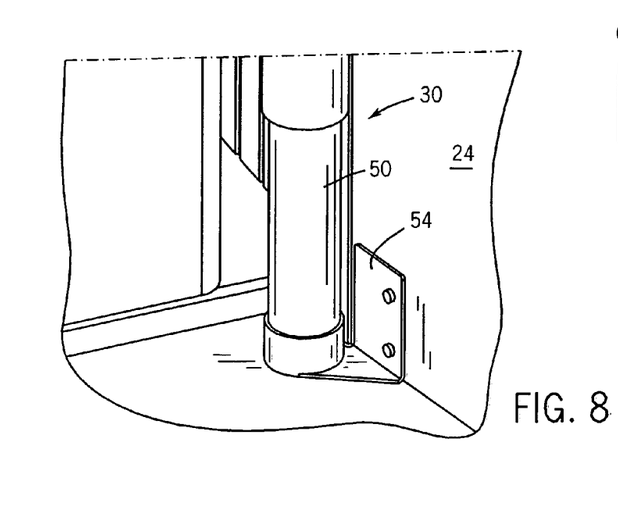
FIG. 8 is a perspective view showing the lower end of the hinge.

Referring still to FIGS. 1 and 2 and now also to FIGS. 3–6, each of the pivot-out rooms 12 and 14 are generally pie or wedge shaped, and are hinged at a pointed end 22 to a stationary sidewall 24 or 26 of the vehicle 10 with a hinge structure 30 (FIG. 7). The pivot-out rooms 12 and 14 each include a base wall or floor 33, a top wall or roof 31, an exterior wall 29 and an end wall 25 at the large end of the wedge-shaped structure. A small end wall may be provided at the pivoted end if necessary or desired. As shown, the interior side of each of the pivot-out rooms 12 and 14 is open. However, these sides can be either open, or partially closed by a wall. Although as shown here, the pivot out rooms are of different size, the sections 12 and 14 may be of the same or different sizes.

Referring now specifically to FIG. 1, the pivot-out rooms 12 and 14 are shown in the retracted position, with the exterior walls 29 of each of the sections 12 and 14 substantially parallel to and generally aligned with stationary walls 24 and 26 of the vehicle 10, respectively. As shown, the section 12 has its pivoted end 22 hinged toward the front of the recreational vehicle 10 and the section 14 has its pivoted end hinged toward the rear of the recreational vehicle 10, and the inner edges are arranged parallel to one another such that walls 25 at the large end of the wedge-shaped sections are offset in the interior 21, allowing for a hallway to be provided in the interior 21 of sufficient space to allow a person to pass and also to allow use of the facilities that are mounted on the sections 12 and 14. These can be, for example, a galley on section 14 and seating, sleep or other functional areas on the section 12. Although the inner edges are preferably arranged in a parallel configuration to provide the most efficient hallway space, as illustrated, other configurations could also be used.

Referring now to FIGS. 2–6, when the sections 12 and 14 are expanded, the floor 33 of each section moves with the section, as do the roof 31, outside wall 29 and the end wall 25. In the fully extended position, the exterior wall 29 is angled with respect to the stationary wall 24 at a pivot-out angle of approximately 10–15 degrees in the embodiment shown. The sections 12 and 14 do not totally overlap one another from side to side but are arranged so that when they are pivoted out, both add to the widthwise dimension of the interior space of the recreational vehicle 10, as shown in FIG. 2. In one design, the interior diagonal dimension from outer corner 32 of section 12 to outer corner 34 of section 14 was approximately 178 inches, providing a very significant widthwise dimension in the vehicle, and a significant increase in living space. Advantageously, this design also varies the shape of the interior space from purely right angles to add architectural complexity and interest, as illustrated in FIGS. 3–6. In addition, a linear slide-out section 40 (or a pivot out section) can be provided in one or both of the sections 12 and 14, as illustrated in the section 12 in FIGS. 3–6. Although a specific pivot angle is described above, it will be apparent that the angle could be varied.

Referring now also to FIG. 7, the hinge structure 30 for coupling the sections 12 and 14 to the vehicle 10 generally includes a hinge pin 50, stationary hinge mounting brackets 52 and 54, and movable hinge members 56 and 58. In the illustrated embodiment, the hinge pin 50 is a hollow tube made of a rigid material such as steel. The stationary hinge mounting brackets 52 and 54 each include a tubular member 53, sized and dimensioned to receive the pin 50, and a flat bracket 55 which can be mounted to the stationary wall 24 or 26 in the recreational vehicle 10 using, for example, bolts. The tubular member 53 of the brackets 52 and 54 is welded or otherwise affixed to opposing ends of the hinge pin 50, and the flat bracket section 55 is securely affixed to a structural component of the vehicle 10, as, for example, a frame member of the stationary wall 24 or 26, so that the hinge pin and associated mounting brackets 53 and 55 are immovable relative to the frame of the vehicle.

The movable hinge members 56 and 58 each include a ring portion 57 and a flat mounting bracket 66. The ring portion 57 is sized and dimensioned to encircle the pin 50 with sufficient clearance to allow the hinge members 56 and 58 to rotate relative to the pin 50. The flat bracket section 66 is secured to structural members of the respective pivot-out section 12 or 14 so that the hinge members 56 and 58 are immovable relative to the pivot-out section 12 or 14.

Figure 9:
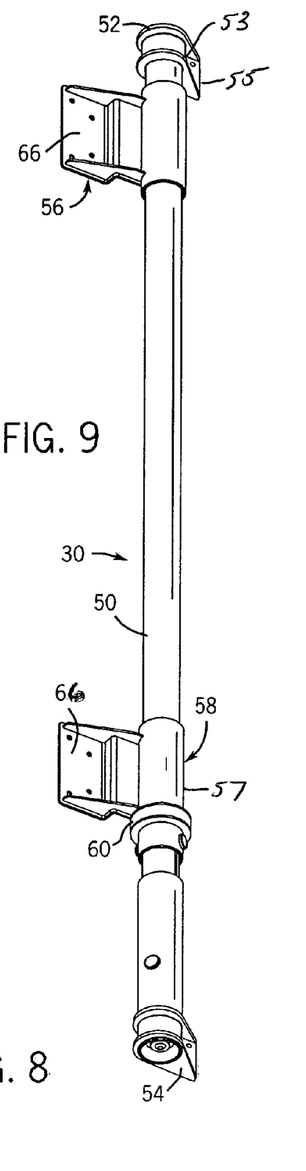
FIG. 9 is a perspective view of the hinge alone.
Figure 10:
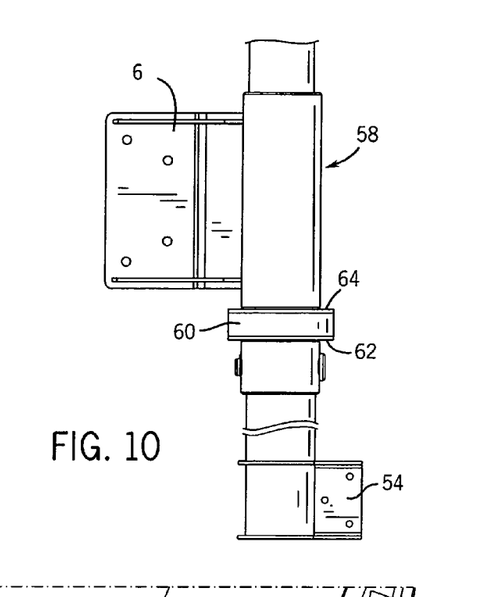
FIG. 10 is a plan view of the lower end of the hinge including the hinge plate that is secured to the pivot out room and the hinge plate that is secured to the stationary wall of the recreational vehicle.

The hinge structure 30, as illustrated in FIGS. 9 and 10, also includes a thrust washer 60 that is ring shaped so as to encircle the hinge pin 50 and is trapped between a stationary flange 62 that is secured to the hinge pin 50 and movable flange 64 that is secured to the hinge member 58. The thrust bearing 60 bears much, if not all, of the weight of the slide-out section 12 or 14 that it is supporting. The thrust bearing 60 may be a journal bearing as illustrated, made of a rigid and lubricious material such as a suitable plastic like nylon, HDPE, or Delrin, or another bearing material such as brass (which may be oil impregnated) or a similar type of bearing material. The thrust bearing 60 could also be a ball or sleeve bearing, or another type of roller bearing or other anti-friction bearing.

Figure 11:
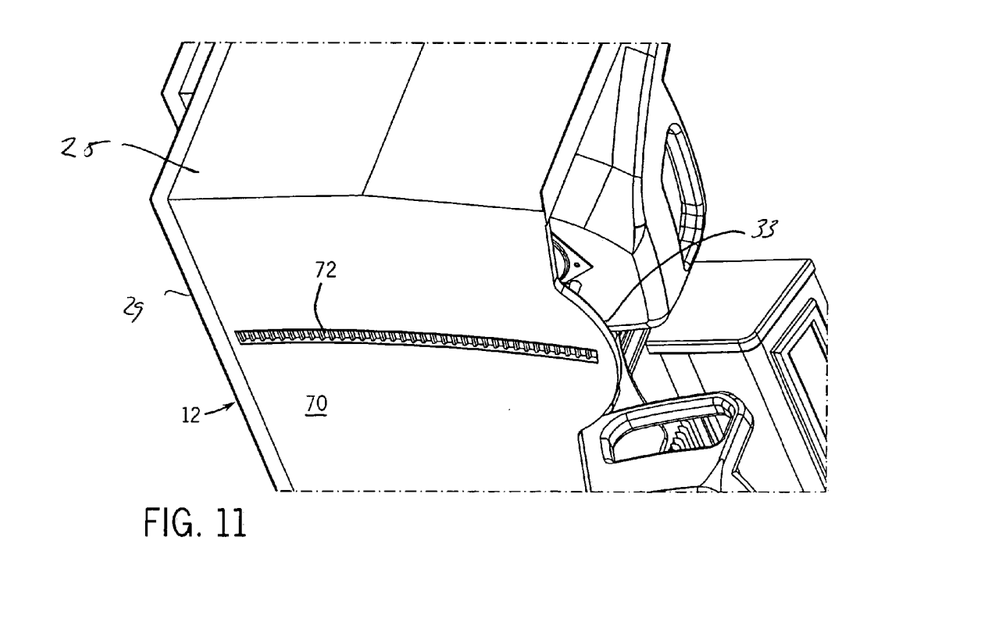
FIG. 11 is a bottom perspective view of the end of the slide-out room that is pivoted out, illustrating a cog gear rack on the bottom of the room.
Figures 12A, 12B, 13:
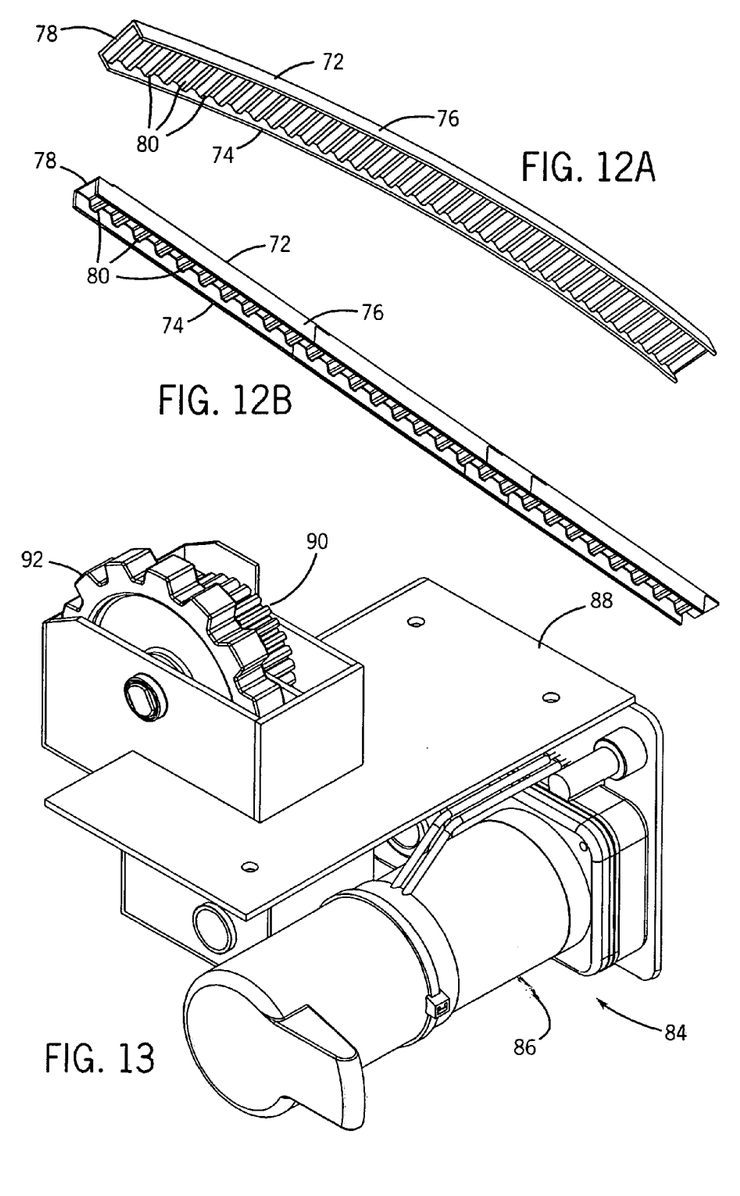
FIG. 12A is a view of the cog gear rack alone, shown in a straight configuration.
FIG. 12B is a view of the cog gear rack alone, shown in an arced configuration.
FIG. 13 is a perspective view of a cog gear drive for the room.

Referring now to FIGS. 11–13, a drive system for driving the pivot-out sections 12 and 14 between the retracted and the extended positions is shown. Referring first to FIG. 11, the lower side of the bottom wall 70 of each slide-out section 12 or 14 has mounted on it a cog type gear rack 72 which, as illustrated in FIGS. 11 and 12*a*, has a slight curve in the lateral direction so as to follow a radial line that is centered on the hinge axis of the hinge pin 50. FIG. 12*b* illustrates a straight cog rack 72. If the pivot out room 12 or 14 is large enough, a straight cog rack 72 may be used, since the amount of curve would be so small as to be essentially irrelevant. The cog rack 72 is three-sided, having sidewalls 74 and 76, a base wall 78, and a series of uniformly spaced teeth 80 that are supported at their ends by the respective sidewalls 72 and 74 and are supported at their bases by the base wall 78. The cog rack 72 may be a cast or plastic molded component. The cog rack 72 would be secured to the lower surface of the floor 31 at the pivot-out section by screws, adhesive, or any appropriate means. The cog rack can be constructed of lightweight materials, and therefore adds minimal weight to the pivot-out section.

FIG. 13 illustrates a cog drive unit 84 that can be positioned adjacent the floor 13 in the recreational vehicle 10 and used to drive the pivot out section 12 or 14 to extend or retract the respective section. The cog drive unit 84 has a motor gear unit 86 of a type that is used for many linear slide-outs. The motor unit 86 preferably includes an electric brake such that when power is turned off to the motor 86, the brake is applied so that rotation of the motor shaft is stopped under normal circumstances. As is known, the motor unit 86 may also have a manual release lever so that if power is lost, the brake can be released so that the slide-out unit can be manually retracted or extended. The unit 84 mounts the motor 86 to a bracket 88 on which a gear train is included that drives a drive gear 90. Drive gear 90 is fixed to cog wheel 92 so that they rotate together and the cog wheel 92 is in meshing engagement with the teeth 80 of the rack 72. The large contact surfaces of the cog wheel 92 and rack 72 meshing with each other are capable of bearing a significant weight of the respective slide-out section 12 or 14 if necessary, and therefore may be used to bear any portion of the weight of the slide-out section not borne by the hinge pin 50.

In addition, the sidewalls 74 and 76 maintain tracking of the cog wheel 92 inside the rack 72 to provide greater stability, and also support for the teeth 80.

Figure 14:
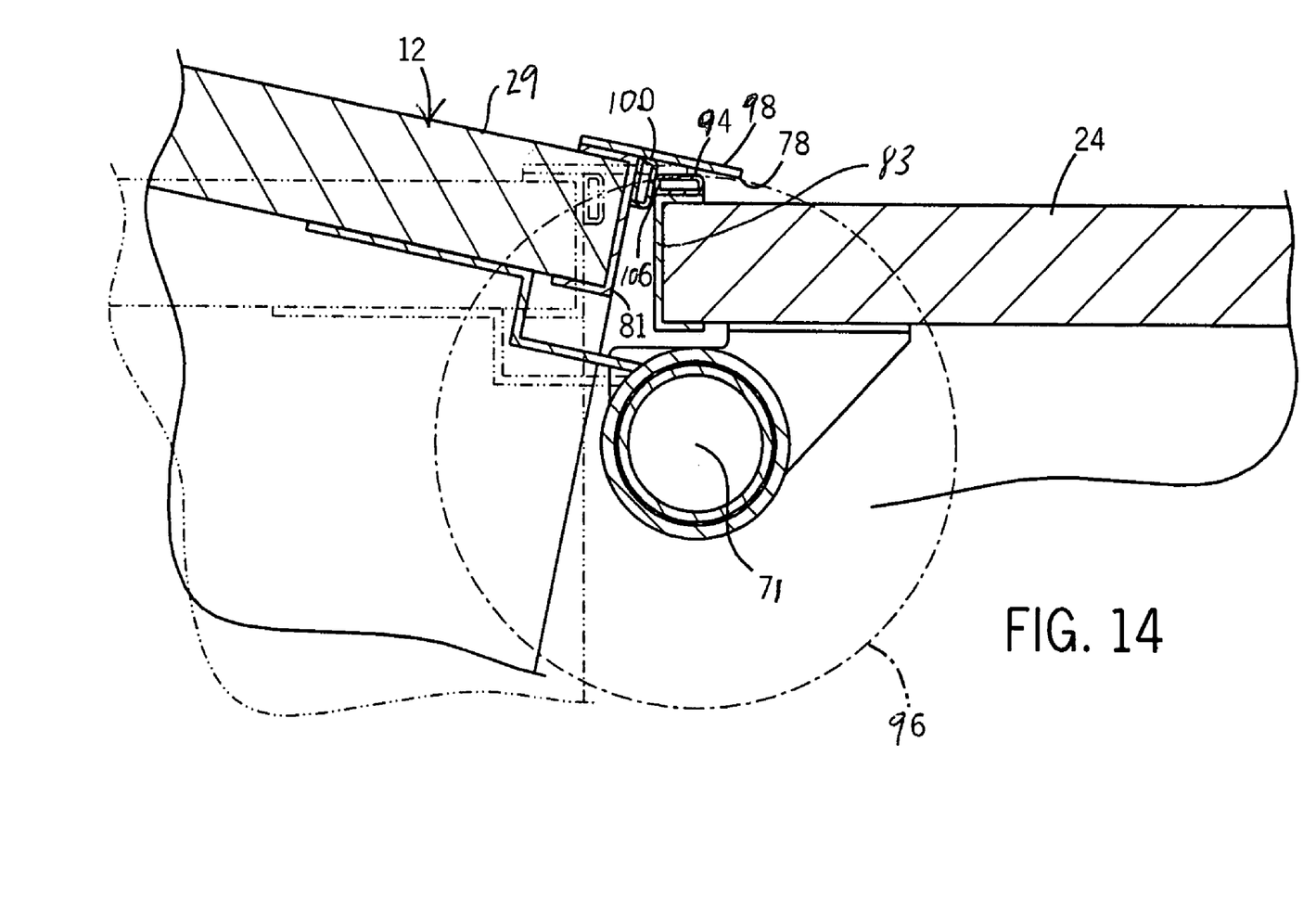
FIG. 14 is a top elevation view illustrating the relationships between the hinge axis, the pivot out room and stationary walls, and the seals in the extended and retracted positions.

Referring now to FIG. 14, a cross-sectional view looking down at the junction between the exterior wall 29 of the pivot-out section 12 and the stationary wall 24 of the recreational vehicle 10 at the hinged end 22 is shown, illustrating the position of the hinge pin 50 and gaskets for sealing the interface between the wall 24 of the recreational vehicle 10 and pivot out section 12 in both the retracted position and the extended positions. An outer gasket 94 is coupled to the stationary wall 24 of the vehicle 10, adjacent a corner 96 formed with the end surface 83 of the wall 24. A second gasket 100 can be affixed to an end surface 81 of the wall 29, adjacent an exterior surface of the wall. Both gaskets 94 and 100 are compressible elastomeric gaskets of the type normally used in recreational vehicle slide-out rooms.

Referring still to FIG. 14, a seal flange section 98 extends from an edge of the wall 29 of the pivot out section 12 and overlaps the wall 24. The axis of the hinge pin 50, hinge axis 71, is spaced inwardly a small distance from the inside surface of the stationary wall 24 of the recreational vehicle 10, at a distance of, for example, 2 inches, and is aligned with the outer seal 94. In the retracted position (shown here in phantom), the seal flange 98 compresses gasket 94, forming a seal between the wall 24 and flange 98, and therefore between the walls 24 and 29.

To expand the room 12, the motor 86 of the cog drive system 84 (FIG. 13) is activated, causing the room 12 to move along cog rack 72 (FIGS. 1, 12A, and 12B), and radially about hinge pin 50. As the room 12 is rotated to the extended position, the distal end of the seal flange 98 moves along radial line 106 of the hinge axis 71, around the gasket 94, avoiding damage to the gasket 94. In the expanded position, the seal flange, and preferably gasket 100, compresses against gasket 94 to create a seal at the corner 86 between the outside edge of exterior wall 29 of the pivot-out section 12 and the outside edge of the stationary wall 24 of the recreational vehicle 10, limiting the flow of fluids into and out of the vehicle 10. It is understood that the seals 94 and 100 and the flange 98 run for the full height of the room 12 and would be contiguous with the top and bottom and opposite side seals around the perimeter of the room 12 to create a seal all the way around the perimeter of the room 12.

In the expanded position of FIG. 2, the thrust washer 60 (FIGS. 9, 10) supports at least part of the weight of the room 12 at the hinged end 22 of the room 12. The room 12 is largely cantilevered from the hinge 50 and therefore if the room 12 is sufficiently rigid, no additional support is required. However, to prevent sagging at the opposite end 25 of the room 12, additional support may be provided such as rollers or sliders between the pivot out room 12 and the recreational vehicle 10, or the drive system may be used to provide support at that end.

Although a seal for sealing the outer surface of the walls 29 and 24 is shown, it will be apparent that a seal for sealing the interior walls could also be provided. To provide such a seal, the hinge 30 and associated brackets would be relocated to provide additional room between the wall 24 and the hinge pin 50 to allow for positioning of seals or gaskets. A first gasket, for example, can then be mounted adjacent an interior side of the wall 24 and end face 83, and a second gasket can be mounted to a bracket which angles the second gasket with respect to the wall 24, substantially at the pivot angle. A second seal flange can be coupled to the inside of the wall 29 of the pivoted room. In the expanded position, the flange compresses the first gasket, providing a seal between walls 24 and 29. As the pivot-out room is expanded, the flange moves to compress the second gasket, again providing a seal between the walls 24 and 29. The gaskets can be compressible elastomeric gaskets of the type normally used in recreational vehicle slide-out rooms, as described above, and can extend for the full height of the room 12, also as discussed above.

A preferred embodiment of the invention has been described in considerable detail. Many modifications and variations to the embodiment described will be apparent to those skilled in the art. For example, although a specific cog rack and cog drive is used, other types of drive systems, such as telescoping rails, could also be used. Furthermore, the room could be driven using cables, chains, gears, one or more hydraulic cylinders, a lead screw, manually or by other means. Therefore, the invention should not be limited to the embodiment described, but should be defined by the claims which follow.

I claim:

1. In a vehicle having a pivot out section that can be pivoted out away from a stationary section of the vehicle to expand the interior space of the vehicle, the improvement wherein a hinge connects a pivoted end of the pivot out section to the stationary portion of the vehicle and the pivot axis of the hinge is spaced inwardly from the outer surface of the stationary portion of the vehicle and is adapted to compress a seal between an end surface of the pivot out section and a stationary portion of the vehicle when the pivot out section is extended from the vehicle.

2. The improvement of claim 1, wherein the pivot axis is spaced a distance from an end of the vehicle wall on a side of the vehicle wall opposite from the pivot out section.

3. The improvement of claim 1, wherein an exterior wall of the pivot out section includes a seal flange for compressing the seal between the pivot out section and the stationary portion of the vehicle when the pivot out section is in a retracted position.

4. The improvement of claim 3, wherein the pivot axis is positioned so as to move the seal flange away from the outer seal when the pivot out section is extended from the vehicle.

5. The improvement of claim 1, further comprising a second seal coupled to the end surface of the pivot out section, the second seal compressing against the seal when the pivot out section is in the extended position.

6. The improvement of claim 1, wherein the pivot axis is aligned with the seal.

7. In a recreational The vehicle of claim 1, further comprising a second having a pivot out room section which is pivoted out about a vertical axis, the improvement wherein two pivot out room sections are provided in the recreational vehicle, one on wherein the pivot out section is on one side of the vehicle and the other second pivot out section is on the other side of the vehicle, said sections at least partially overlapping from side to side along the length of the vehicle, one said section having its pivot axis toward the front of the vehicle and the other said section having its pivot axis toward the rear of the vehicle.

8. The improvement of claim 7, wherein the pivot out section and the second pivot out section create a hallway having generally parallel sides when the pivot out section and the second pivot out sections are retracted.

9. The improvement of claim 7, wherein the pivot out section and the second pivot out section are wedge-shaped and each include a pointed end.

10. The improvement of claim 9, wherein the pivot out section and the second pivot out section are pivoted about the pointed end.

11. The vehicle of claim 1, wherein the hinge includes a thrust bearing that supports at least a portion of the weight of the pivot out section.

12. The vehicle of claim 1, wherein a cog rack is provided on a bottom side of the pivot out section at an end opposite from the hinged end and a cog drive is coupled to the vehicle to drive the cog rack in and out to retract and expand the vehicle.

13. The improvement of claim 12, wherein the cog drive supports a portion of the weight of the pivot out section.

14. The improvement of claim 12, wherein the cog rack is arced to follow a radial line around the pivot axis.

15. The improvement of claim 12, wherein the cog rack is linear.

16. The recreational vehicle of claim 12, wherein the cog drive system comprises a cog wheel coupled to a floor of the recreational vehicle.

17. The recreational vehicle of claim 16, wherein the cog rack includes teeth sized and dimensioned to mesh with teeth in the cog wheel.

* * * * *

UNITED STATES PATENT AND TRADEMARK OFFICE
CERTIFICATE OF CORRECTION

PATENT NO. : 7,204,536 B2 Page 1 of 1
APPLICATION NO. : 11/289162
DATED : April 17, 2007
INVENTOR(S) : James R. Kunz It is certified that error appears in the above-identified patent and that said Letters Patent is hereby corrected as shown below:

Column 6, Line 31
"(FIGS. 1, 12A and 12B)" should be --(FIGS. 11, 12A, and 12B)--

Column 8, Line 17
"sections" should be --section--

Claim 7
Column 8, line3
"In a recreational The vehicle of claim 1, further comprising a second having a pivot out room section which is pivoted out about a vertical axis, the improvement wherein two pivot out room sections are provided in the recreational vehicle, one on wherein the pivot out section is on one side of the vehicle and the other second" should be
--The vehicle of claim 1, further comprising a second pivot out room section which is pivoted out about a vertical axis, wherein the pivot out section is on one side of the vehicle and the second--

Signed and Sealed this

Twenty-seventh Day of November, 2007

JON W. DUDAS
*Director of the United States Patent and Trademark Office*